(12) United States Patent
MacNamara et al.

(10) Patent No.: US 7,088,815 B2
(45) Date of Patent: Aug. 8, 2006

(54) TRUE ALERT INDICATION

(75) Inventors: John J. MacNamara, Orland Park, IL (US); Randall Joe Wilson, Naperville, IL (US); Christopher John Davolos, Warrenville, IL (US); Ronald Bruce Martin, Carol Stream, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 367 days.

(21) Appl. No.: 10/440,629

(22) Filed: May 19, 2003

(65) Prior Publication Data

US 2004/0234044 A1    Nov. 25, 2004

(51) Int. Cl.
*H04M 1/00*    (2006.01)
(52) U.S. Cl. .................. 379/373.01; 455/414.1
(58) Field of Classification Search .............. 455/567, 455/414.1, 415, 418; 379/373.01
See application file for complete search history.

(56) References Cited

U.S. PATENT DOCUMENTS

| 4,751,729 A | * | 6/1988 | Coleman ............... 379/376.01 |
| 2003/0194080 A1 | * | 10/2003 | Michaelis et al. .......... 379/257 |

* cited by examiner

*Primary Examiner*—Fan Tsang
*Assistant Examiner*—Olisa Anwah

(57) ABSTRACT

An end user terminal (EUT), e.g., such as mobile terminal (MT) (20), is provided for connecting with an incoming call received over a communications network (A). Suitably, the EUT includes an alerting function and/or equipment that provides perceivable alerting in response to an incoming call attempting to connect with the EUT over the communications network (A). An alert sensor (AS) (22) detects an alerting status of the EUT, which is then communicated over the communications network (A), e.g., back to the calling EUT 50.

19 Claims, 2 Drawing Sheets

TRUE ALERT INDICATION

FIELD

The present invention relates to the communication arts. It finds particular application in conjunction with wireless or mobile telephones, and will be described with particular reference thereto. However, it is to be appreciated that the present invention is also amenable to other like applications and suited to other end user terminals including wire-line devices.

BACKGROUND

There are a variety of different communications devices known in the field, including both wireless or mobile devices and so called wire-line devices, that an end user or party may employ to communicate over known networks, e.g., a public switched telephone network (PSTN), packet data network (PDN), etc. Often referred to generally as an end user terminal (EUT), exemplary devices include telephones, personal digital assistants (PDAs), computers, pagers, etc. More specifically, an EUT that accesses a communications network over a wireless or so called air interface, e.g., using what is known as a cellular network (CN), is referred to as a mobile terminal (MT). Known MTs include mobile phones, pagers, wireless PDAs, wireless equipped laptop or notebook computers, etc.

In many instances, an EUT is provisioned with its own alerting function and/or equipment that provides a perceivable indication (e.g., ringing, vibrating, visual notification, etc.) of an incoming communication or attempted connection therewith. The EUT generally invokes its alerting function in response to receiving an appropriate signal over a communication network attempting to establish a connection therewith. In this manner, the party to which the EUT belongs is typically informed of the incoming communication and may take appropriate action, e.g., answering the call. However, it can be a problem that an end user initiating communication (i.e., the calling party) with another end user (i.e., the called party) is not sufficiently assured that the called party's EUT adequately performed its alerting function such that the called party was in fact informed of the call or attempted connection.

The aforementioned problem has heretofore been particularly prevalent in connection with calls to MTs. For example, the following scenario has been known to take place. A calling party calls the MT of a called party who fails to answer the call. After the fact, the calling party questions the called party as to why they did not answer the call, but the called party claims that they never received the call, i.e., that their MT never rang or otherwise invoked its alerting function. In such instances, the calling party may often find it desirable to have evidence or information by which to verify or refute the called parties claim.

As evidence that a called EUT rang, the calling party may want to rely on the fact that they heard "ringing" on their end, i.e., on the calling EUT. However, this evidence is often inconclusive in this regard. The "ringing" heard on the EUT from which a call is placed is commonly what is referred to as ring-back. Strictly speaking, hearing ring-back is not always conclusive evidence that the called EUT in fact alerted the called party. That is to say, the ring-back returned to the calling EUT is generally not the same ringing being generated by the called EUT. For example, in some instances, a network element, entity or facility (such as a central office (CO) or end office or other switching center, the called-party servicing switch or the calling-party switch or other switch, a mobile switching center (MSC) or another element, entity or facility of the communications network) is responsible for generating and/or returning ring-back to the calling EUT, and it may be done without direct confirmation that the called EUT is in fact alerting.

For example, with respect to connecting a call to a MT, the call generally has to be routed through the PSTN to an appropriate MSC, the MT typically has to be identified, located and paged, a response to the page has to be received back from the MT, and an appropriate signal has to be sent to the MT telling it to invoke its alerting function, all before the MT can actually invoke its alerting function. That is to say, there may be considerable lag time between when the calling party finishes dialing and when the MT is signaled to invoke its alerting function. However, to comfort the calling party so that they do not feel as though the call is not going through (as may be the case if they were to experience dead air or silence), a designated network element often returns ring-back or other comfort noise to the calling EUT during this time, i.e., while the call is still being routed and/or while attempting to establish a connection with the MT. Should no connection ultimately be established for what ever reason or should the calling party hang up prior to connecting, the calling party may interpret the ring-back as evidence that the MT was alerting when in fact it was not.

With the traditional approach of providing ring-back from a network element to the calling EUT, the ring-back still may not positively confirm actual alerting even if the called EUT receives the signal prompting it to invoke its alerting function and it attempts to do so. That is to say, the network element providing the ring-back often times only knows at most that the appropriate signal was sent or is being sent to prompt the called EUT to invoke its alerting function. However, it may not know if the prompting signal is properly received by the called EUT nor does it typically know if the called EUT has its alerting function and/or equipment turned off or disabled or if the alerting function and/or equipment is otherwise inoperative, e.g., due to failure. Further, EUTs, and in particular MTs, often have various modes by which alerting may be carried out, and the calling party may desire to know not only whether or not the called EUT has actually performed some form of alerting, but also the mode of any alerting that may or may not have occurred, e.g., via audible, kinetic, or visual notification. Again, the traditional approach does not provide this information.

The present invention contemplates a new and improved alert indicating system and/or technique that overcomes the above-referenced problems and others.

SUMMARY

In accordance with an aspect of the present invention, an EUT is provided having means for connecting with an incoming call received over a communications network. The EUT includes: alerting means for providing perceivable alerting in response to an incoming call attempting to connect with the EUT over the communications network; sensing means for detecting an alerting status of the EUT; and, communicating means for communicating the detected alerting status of the EUT over the communications network.

In accordance with another aspect of the present invention, a method of communicating an alerting status of an EUT is provided. The method includes: outputting from the EUT perceivable alerting in response to an incoming call attempting to connect with the EUT over a communications network; detecting an alerting status of the EUT; and, communicating the detected alerting status of the EUT over the communications network.

In accordance with yet another aspect of the present invention, a method is provided for indicating to a calling party an alerting status of an EUT called over a communications network. The method includes: receiving a dialed telephone number from a calling party calling an EUT having an alerting function implemented to provide perceivable alerting of an incoming call; attempting to establish a connection with the EUT in accordance with the dialed telephone number; providing ring-back to the calling party while attempting to establish the connection with the EUT; ascertaining an alerting status of the EUT, the alerting status reflecting a condition of the alerting function of the EUT; and, indicating the ascertained alerting status of the EUT to the calling party.

Numerous advantages and benefits of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is to be appreciated that the drawings are not to scale.

DETAILED DESCRIPTION OF PREFERRED EMBODIMENTS

For clarity and simplicity, the present specification shall refer to structural and/or functional network elements, entities and/or facilities, relevant communications standards, protocols and/or services, EUTs and other components that are commonly known in the communications art without further detailed explanation as to their configuration or operation except to the extent the same has been modified or altered in accordance with and/or to accommodate aspects of the present invention.

Figure 1:
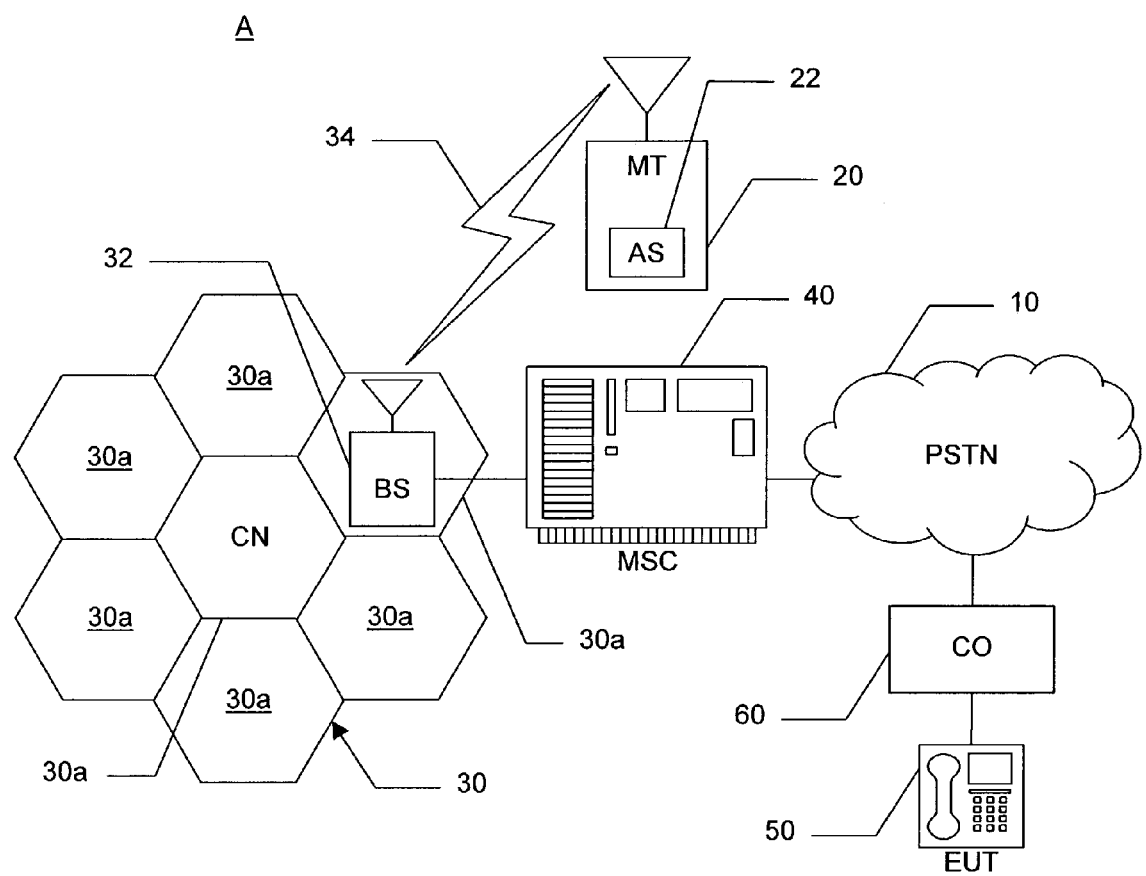
FIG. 1 is a block diagram showing an exemplary communications network and EUT suitable for practicing aspects of the present invention.

With reference to FIG. 1, a communications network A includes a communications network over which calls are routed and connections established between EUTs. A PSTN 10 is shown, suitably however, the network over which the EUTs are connected and/or communicate is a PDN or some combination of a PSTN and PDN or some other communications network including but not limited to a postal, telegraph, and telephone (PTT) network or a network providing packet service, multimedia service, voice over internet protocol (VoIP) service, etc. As shown, an MT 20 receives service over a CN 30 that includes a base station (BS) 32 with which the MT 20 operatively connects via a wireless air interface 34. An MSC 40 interfaces the CN 30 with the PSTN 10 in the usual manner. Also shown is a wire-line based EUT 50 which accesses the PSTN 10 via a CO 60.

Aspects of the present invention are described herein with reference to a call or calls between the MT 20 and EUT 50, so for clarity and simplicity, only these terminals and their supporting network elements are shown. However, it is to be appreciated that suitably a plurality of such terminals and/or supporting network elements are similarly equipped and/or situated in the usual manner so as to likewise take advantage of aspects of the present invention in connection with calls between any combination of calling and called EUTs. Further, for exemplary purposes herein the calling EUT is considered to be the wire-line based EUT 50 and the called EUT is considered to be the wireless based MT 20. However, it is to be appreciate that optionally the calling EUT may be either a wireless or wire-line based EUT. Likewise, the called EUT may be either a wireless or wire-line based EUT provided in either case that it is similarly equipped and/or provisioned for alert indicating as described herein with respect to the MT 20.

As shown, the MT 20 is equipped with an alert sensor (AS) 22. Suitably, the AS 22 comprises a transducer that detects when the MT 20 is actually alerting. For example, the transducer is optionally a microphone or other audio sensor that detects when the MT 20 plays an audible alert. Alternately, the transducer is suitably a piezoelectric element or other like transducer that detects when the MT 20 is vibrating, either as the result of a kinetic alert function or as the resulting of an audible alert function (e.g., resulting from the terminal's ringing). In the case of visual alerting, the AS 22 suitably comprises a photoelectric device that detects light emitted from a light emitting diode (LED) or other visual alert indicator. Accordingly, the AS 22 detects whether or not the MT 20 is actually providing perceivable alerting. This information is then returned from the MT 20 and optionally relayed to the calling party using either in band or out of band signaling.

In a suitable embodiment, the AS 22 optionally comprises a voltage or current sensor that detects energizing of the MT's alerting hardware or equipment, e.g., the MT's speaker, LED or other visual indicator, vibrator, etc. For example, the voltage or current sensor is optionally arranged to detect the voltage or current that is applied to the MT's speaker to produce ringing or other alert tones. Similarly, in the case of visual or tactile (i.e., kinetic) alerting, the voltage or current sensor is optionally arranged to detect the voltage or current that is applied to illuminate the MT's visual indicator or applied to the MT's vibrator. Accordingly, the AS 22 detects whether or not the MT 20 is actually energizing its alerting hardware or equipment. This information is then returned from the MT 20 and optionally relayed to the calling party using either in band or out of band with signaling.

Of course, the AS 22 optionally includes any combination of a plurality of the aforementioned transducers, detectors and/or sensor types. Suitably, at least enough are provided to detect each possible alerting mode supported by the MT 20.

In a suitable embodiment, the AS 22 comprises a functional entity within the MT 20 that determines the alerting status of the MT 20 and returns the same. The AS 22 optionally determines the MT's alerting status based on various detected conditions and returns the same for optional routing back to the calling EUT 50. For example, the alerting status may reflect any one or more of: detection of actual perceivable alerting; detection of energizing of the MT's alerting hardware or equipment; or, merely detection of successful receipt of the appropriate signal that prompts alerting. As can be readily appreciated, however, detection of actual perceivable alerting provides the truest indication of whether or not the called party is being made aware of the incoming call, that is of course, if the called party is suitably cognizant of the MT 20. Additionally, the alerting status returned optionally also includes information identifying which mode of alerting (i.e., audible, visual or tactile) is being implemented by the MT 20.

While FIG. 1 depicts a particular exemplary network A over which the MT 20 and EUT 50 communicate, it is to be appreciated that the transport medium over which the communication takes place optionally includes wire, air interface, radio link, optical or any combination of such mediums. In a suitable embodiment, the transport and/or signaling protocols employed may be any of a variety of known protocols, e.g., analog protocols, H.248, Session Initiation Protocol (SIP), ANSI 41, SS7, etc.

Figure 2:
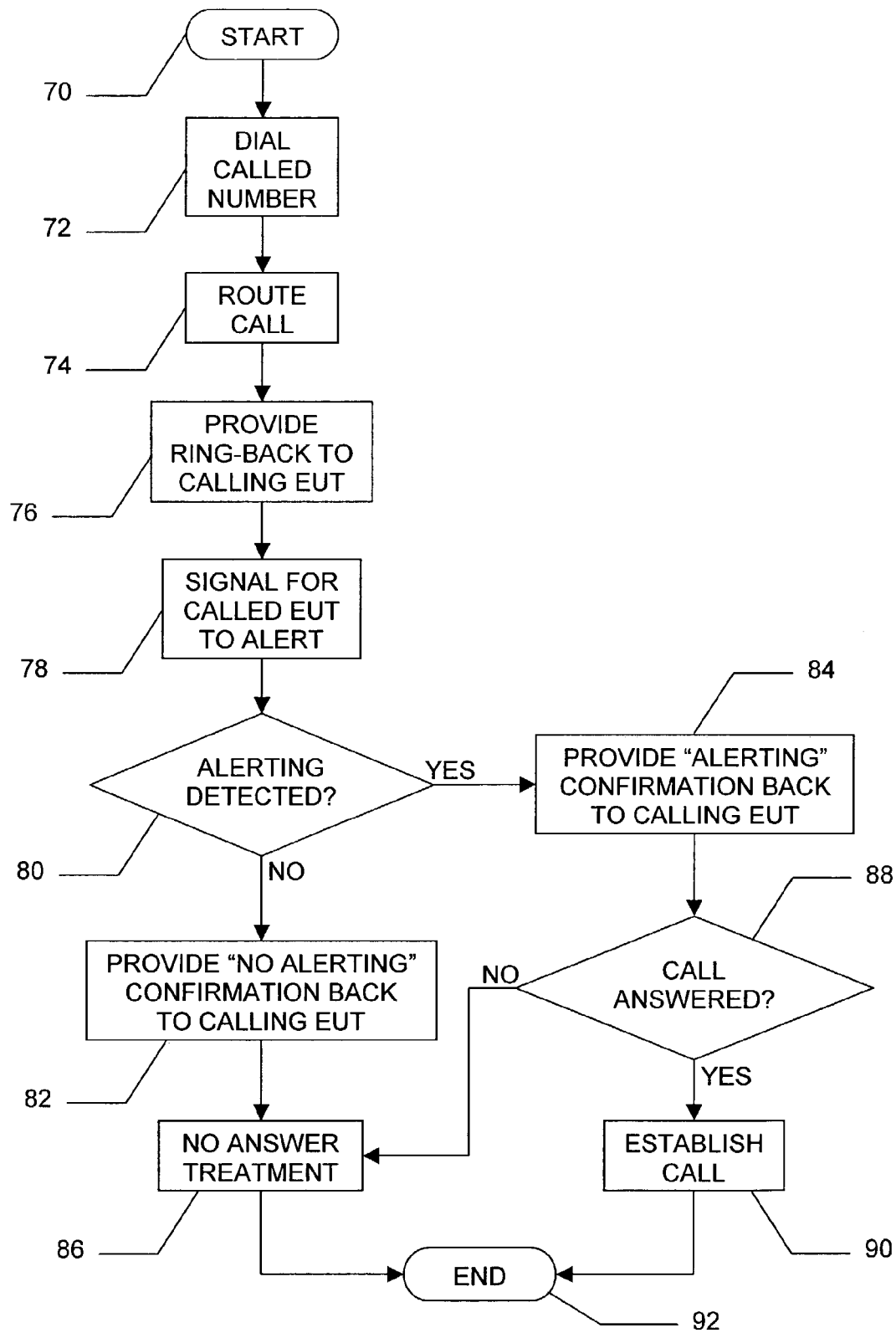
FIG. 2 is a flow chart showing an exemplary method of providing alert indication to a calling party suitable for practicing aspects of the present invention.

With reference to FIG. 2, an exemplary alert indication process is described by way of an exemplary call from the EUT 50 to the MT 20. The process starts at step 70. The calling party uses the EUT 50 to dial the number of the called party's MT 20 at step 72. At step 74, the call is routed from the EUT 50 to the MT 20. That is to say, the EUT 50 connects with the CO 60 serving the same, and via the CO 60 the call and/or appropriate call set-up signaling is routed over the PSTN 10 to the appropriate MSC 40. The MSC 40 identifies a cell 30a of the CN 30 in which the MT 20 is located, e.g., by broadcasting a page for the MT 20 and receiving a response back to the page. The call and/or call set-up signaling is then routed from the MSC 40 to the BS 32 providing coverage for the identified cell 30a.

At step 76, ring-back is provided to EUT 50 while the call is being routed and/or an attempt is being made to establish a connection with the MT 20 so that the calling party perceives that the call is in progress and/or is otherwise comforted. Suitably, the ring-back is generated and/or provided by the CO 60, the MSC 40 or some other network element, entity or facility of the PSTN 10, e.g., an intermediate switch. At step 78, appropriate signaling for prompting the MT 20 to implement its alerting function is sent from the BS 32 to the MT 20 via the air interface 34.

At decision step 80, it is determined if the alerting is being detected by the MT's AS 22. If detected, the process continues to step 84 and if not the process continues to step 82. That is to say, if the AS 22 detects alerting then the MT 20 returns a signal indicative of the same that is routed to a designated network element, such as the MSC 40, the CO 60 or some other network element, entity or facility of the PSTN 10, that provides the appropriate confirmation back to the calling EUT 50, i.e., either that alerting has been detected (step 84) or that no alerting has been detected (step 82). Suitably, the confirmation is provided either using in band or out of band signaling. Optionally, the confirmation takes the form of a particular ring-back pattern or tone pattern. For example, when no alerting is detected, the previously provided ring-back remains unaltered, and when alerting is detected, the previously provided ring-back is altered thereby indicating the same.

At step 86 following step 82, assuming the call is not answered or a connection with the MT 20 is not otherwise established, the call is processed as per a designated or otherwise determined no answer treatment. At decision step 88 following step 84, it is determined if the call is answered. If answered, then the call is established at step 90 in the usual manner, i.e., the call is connected with the MT 20 over the air interface 34, if not the call is processed as per the no answer treatment of step 86. Finally, the process ends at step 92.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively mixed and matched as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. An end user terminal (EUT) including means for connecting with an incoming call received over a communications network, said EUT comprising:

alerting means for providing perceivable alerting in response to an incoming call attempting to connect with the EUT over the communications network;

sensing means for detecting an alerting status of the EUT; and, communicating means for communicating the detected alerting status of the EUT over the communications network;

wherein said alerting means includes equipment that is electrically energized to provide the perceivable alerting, and said sensing means comprises at least one of a voltage or current sensor that detects said electrical energizing.

2. The EUT of claim 1, said alerting means comprising at least one of:

a speaker that plays an audible alert in response to the incoming call attempting to connect with the EUT over the communications network;

a vibrator that vibrates in response to the incoming call attempting to connect with the EUT over the communications network; and, a visual indicator that is illuminated in response to the incoming call attempting to connect with the EUT over the communications network.

3. The EUT of claim 1, wherein the detected alerting status communicated by the communicating means includes information identifying a type of alerting detected by the sensing means as audible, visual or kinetic.

4. The EUT of claim 1, wherein said EUT is a mobile terminal.

5. An end user terminal (EUT) including means for connecting with an incoming call received over a communications network, said EUT comprising:
- alerting means for providing perceivable alerting in response to an incoming call attempting to connect with the EUT over the communications network, said alerting means comprising at least one of:
  - a speaker that plays an audible alert in response to the incoming call attempting to connect with the EUT over the communications network;
  - a vibrator that vibrates in response to the incoming call attempting to connect with the EUT over the communications network; and,
  - a visual indicator that is illuminated in response to the incoming call attempting to connect with the EUT over the communications network;
- sensing means for detecting an alerting status of the EUT, said sensing means comprising at least one of:
  - a microphone that detects the audible alert played by the speaker;
  - a piezoelectric transducer that detects at least one of vibrations resulting from the vibrator vibrating or vibrations resulting from the speaker playing the audible alert; and,
  - a photoelectric device that detects the illumination of the visual indicator; and,
- communicating means for communicating the detected alerting status of the EUT over the communications network.

6. The EUT of claim 5, wherein said EUT is a mobile terminal.

7. The EUT of claim 5, wherein the detected alerting status communicated by the communicating means includes information identifying which type of alerting is detected by the sensing means.

8. A method of communicating an alerting status of an end user terminal (EUT), said method comprising:
- (a) outputting from the EUT perceivable alerting in response to an incoming call attempting to connect with the EUT over a communications network, wherein said outputting comprises electrically energizing equipment such that the equipment provides the perceivable alerting;
- (b) detecting an alerting status of the EUT, wherein said detecting comprises detecting said electrical energizing; and,
- (c) communicating the detected alerting status of the EUT over the communications network.

9. method of claim 8, further comprising:
returning the detected alerting status of the EUT to a calling party that originated the incoming call attempting to connect with the EUT.

10. The method of claim 8, said outputting comprising at least one of:
- playing an audible alert in response to the incoming call attempting to connect with the EUT over the communications network;
- generating a vibration in response to the incoming call attempting to connect with the EUT over the communications network; and,
- illuminating a visual indicator in response to the incoming call attempting to connect with the EUT over the communications network.

11. A method of communicating an alerting status of an end user terminal (EUT), said method comprising:
- (a) outputting from the EUT perceivable alerting in response to an incoming call attempting to connect with the EUT over a communications network, said outputting comprising at least one of:
  - playing an audible alert in response to the incoming call attempting to connect with the EUT over the communications network;
  - generating a vibration in response to the incoming call attempting to connect with the EUT over the communications network; and,
  - illuminating a visual indicator in response to the incoming call attempting to connect with the EUT over the communications network;
- (b) detecting an alerting status of the EUT, said detecting comprising at least one of:
  - detecting the audible alert played;
  - detecting the generated vibration; and,
  - detecting the illumination of the visual indicator; and,
- (c) communicating the detected alerting status of the EUT over the communications network.

12. The method of claim 11, further comprising:
returning the detected alerting status of the EUT to a calling party that originated the incoming call attempting to connect with the EUT.

13. A method of indicating to a calling party an alerting status of an end user terminal (EUT) called over a communications network, said method comprising:
- (a) receiving a dialed telephone number from a calling party calling an EUT having an alerting function implemented to provide perceivable alerting of an incoming call;
- (b) attempting to establish a connection with the EUT in accordance with the dialed telephone number;
- (c) oroviding ring-back to the calling party while attempting to establish the connection with the EUT;
- (d) ascertaining an alerting status of the EUT, said alerting status reflecting a condition of the alerting function of the EUT, wherein said ascertaining includes detecting if an alerting means of the EUT is energized; and,
- (e) indicating the ascertained alerting status of the EUT to the calling party.

14. The method of claim 13, wherein step (b) comprises:
routing a call from the calling party to the EUT; and,
signaling the EUT to implement its alerting function.

15. The method of claim 13, wherein the indicated alerting status includes information identifying a type of alerting implemented by the EUT as audible, visual or kinetic.

16. A method of indicating to a calling party an alerting status of an end user terminal (EUT) called over a communications network, said method comprising:
- (a) receiving a dialed telephone number from a calling party calling an EUT having an alerting function implemented to provide perceivable alerting of an incoming call;
- (b) attempting to establish a connection with the EUT in accordance with the dialed telephone number;
- (c) providing ring-back to the calling party while attempting to establish the connection with the EUT;
- (d) ascertaining an alerting status of the EUT, said alerting status reflecting a condition of the alerting function of the EUT, wherein said ascertaining includes detecting for a perceivable output from an alerting means of the EUT; and, (e) indicating the ascertained alerting status of the EUT to the calling party.

17. The method of claim 16, wherein step (b) comprises: routing a call from the calling party to the EUT; and, signaling the EUT to implement its alerting function.

18. The method of claim 16, wherein the indicated alerting status includes information identifying a type of alerting implemented by the EUT as audible, visual or kinetic.

19. The method of claim 16, wherein the perceivable output is audible, visual or kinetic.

* * * * *